US007054308B1

(12) United States Patent
Conway

(10) Patent No.: US 7,054,308 B1
(45) Date of Patent: May 30, 2006

(54) METHOD AND APPARATUS FOR ESTIMATING THE CALL GRADE OF SERVICE AND OFFERED TRAFFIC FOR VOICE OVER INTERNET PROTOCOL CALLS AT A PSTN-IP NETWORK GATEWAY

(75) Inventor: Adrian Evans Conway, Weston, MA (US)

(73) Assignees: Verizon Laboratories Inc., Waltham, MA (US); Genuity Inc., Burlington, MA (US)

( * ) Notice: Subject to any disclaimer, the term of this patent is extended or adjusted under 35 U.S.C. 154(b) by 1094 days.

(21) Appl. No.: 09/707,726

(22) Filed: Nov. 7, 2000

(51) Int. Cl.
*H04M 3/22* (2006.01)

(52) U.S. Cl. ............... 370/356; 370/252; 370/355; 370/395.2; 370/401; 379/26.01; 379/112.01; 379/112.03; 379/112.06; 379/133

(58) Field of Classification Search ............ 370/252, 370/356, 355, 401, 395.2; 379/26.01, 133, 379/112.01, 112.03, 112.06
See application file for complete search history.

(56) References Cited

U.S. PATENT DOCUMENTS

| 6,366,961 B1* | 4/2002 | Subbiah et al. ............ 709/238 |
| 6,484,145 B1* | 11/2002 | Horne et al. ............... 705/8 |
| 6,584,191 B1* | 6/2003 | McPartlan et al. ...... 379/265.02 |
| 6,604,075 B1* | 8/2003 | Brown et al. ............ 704/270.1 |
| 6,747,953 B1* | 6/2004 | Qureshi et al. ............ 370/235 |

OTHER PUBLICATIONS

ITU-T Recommendation H.323, Visual Telephone Systems and Equipment for Local Area Networks Which Provide Non-Guaranteed Quality of Service, May 1996.
IETF RFC 2128, Dial Control Management Information Base using SMIv2, Mar. 1997.
R.B. Cooper, Introduction to Queueing-Theory, Elsevier North Holland, New York, 1981, pp. 80-82.

(Continued)

*Primary Examiner*—Alpus H. Hsu
*Assistant Examiner*—Justin M. Philpott
(74) *Attorney, Agent, or Firm*—Leonard C. Suchyta, Esq.; Joseph R. Palmieri, Esq.; Fitzpatrick, Cella, Harper & Scinto

(57) ABSTRACT

An apparatus and method are provided for estimating the grade of service (52) and offered traffic (51) for voice over internet protocol calls at a gateway (2) bridging calls between a public switched telephone network (3) and an internet protocol network (4), the gateway (2) having a dial-control management information base. The method comprises the steps of periodically polling the dial-control management information base for dial peer traffic statistics (44), storing the polled data, estimating the carried traffic using the polled data (501), estimating the grade of service (52) by utilizing the Erlang-B formula in an inverse manner (502), operating on the estimated carried traffic obtained in the first estimating step (501), and estimating the offered traffic (51) using the estimated values for the carried traffic and the grade of service (52) obtained in the previous estimation steps (503). In a second embodiment of the invention, a system (FIG. 4) utilizing the method, continuously monitors the grade of service (52) and offered traffic (51) at gateways (2) in an internet protocol telecom network supporting voice over internet protocol. An enhancement of the system further comprises a world wide web interface (46) for generating monitoring reports.

8 Claims, 6 Drawing Sheets

OTHER PUBLICATIONS

H.J. Helgert, Integrated Services Digital Networks, Addison-Wesley, 1991, pp. 53-54.

Materials from World Wide Web Page(s) at http://www.dialpad.com/ and http://www.dialpad.com/products/whats_dialpad.html, May 8, 2000.

Materials from World Web Page(s) at http://www.ganymede.com/products/index.phtml and http://www.ganymede.com/products/chariot/index.phtml, Feb. 29, 2000.

Materials from World Wide Web Page(s) at http://www.zarak.com/product.htm, May 8, 2000.

Materials from World Wide Web Page(s) at http://www.tivoli.com/, Mar. 3, 2000.

Materials from World Wide Web Page(s) at http://www.sun.com/desktop/products/Ultra450/, May 8, 2000.

* cited by examiner

METHOD AND APPARATUS FOR ESTIMATING THE CALL GRADE OF SERVICE AND OFFERED TRAFFIC FOR VOICE OVER INTERNET PROTOCOL CALLS AT A PSTN-IP NETWORK GATEWAY

BACKGROUND OF THE INVENTION

1. Field of the Invention

The present invention relates generally to communications traffic engineering, and specifically to a method and apparatus for estimating the call Grade of Service (GoS), as well as the offered traffic, for Voice over Internet Protocol (VoIP) calls at a Public Switched Telephone Network-Internet Protocol (PSTN-IP) network gateway.

2. Related Art

The deployment of commercial Voice over Internet Protocol (VoIP) services based upon the ITU-T H.323 standard is proliferating as a means to complete telephone calls at a reduced cost. This service is currently offered in a variety of scenarios, as illustrated in FIGS. 1A–1C. In one scenario, illustrated in FIG. 1A, telephone calls are established over the Internet starting from a PC 1 and continuing to a gateway 2 on the Internet. The gateway 'bridges' the call between the IP network 4 and the conventional public circuit-switched telephone network (PSTN) 3. An example of this scenario is the free VoIP telephone service offered by dialpad.com, Inc., (URL http://www.dialpad.com) which brings toll free long distance telephony to its customers, generating its revenues through advertising on the PC client.

In another scenario, depicted in FIG. 1B, intra-European mobile PSTN calls, instead of being channeled directly from a mobile telephone in Europe 11 to a stationary telephone in Europe 12, and incurring the applicable toll, they are redirected to an Internet gateway 5, located in Europe, from there routed over the Internet to another Internet gateway 14 in the United States. The U.S. gateway 14 then dials back to Europe over the conventional long-distance PSTN network 15 and reaches the stationary telephone in Europe 12. In this scenario, the cost savings are attributable to arbitrage, i.e. the relative price fluctuation between long distance calls from the United States to Europe, and the cost of a telephone call from a mobile phone within Europe.

In a third scenario, shown in FIG. 1C, telephone calls originating within a private enterprise at a private telephone 21, routed through the enterprise's private branch exchange (PBX) 22, (i.e., a switching system owned or leased by a business or organization providing both internal switching functions and access to the public network), are bridged onto the Internet at an enterprise PSTN-IP gateway 23. The calls are then established via the Internet to a remote gateway 24, where the call is then bridged back onto the remotely-located local PSTN 26, entering that PSTN at a remote gateway 24 which is a local call's distance from the call's ultimate recipient telephone 25. In such a scenario, long distance costs are avoided.

Due to the fact that the Internet, at present, does not in general support any quality of service (QoS) guarantees, in order to provide commercial VoIP services it is necessary to continuously monitor the end-to-end QoS that is seen at the software application layer in order to (i) maintain an acceptable QoS, (ii) plan for equipment expansion as traffic volumes increase, and (iii) remain ahead of the traffic demands.

In providing VoIP service, there are four main application layer QoS measures of importance: the end-to-end IP packet loss ratio, the one-way end-to-end IP packet delay, the one-way end-to-end IP packet delay jitter, and the call grade-of-service (GoS). The first three measures are at the IP network layer. The GoS is a session layer measure, defined to be the probability that a new call attempt is blocked and lost. Thus, the lower the GoS, the lower the probability of the call getting blocked, and the higher the probability of the call getting through. A low GoS is desirable, and a GoS of zero denotes the ideal case where all calls always get through (which is only possible in general with unlimited channels being available). The GoS at a gateway becomes a factor whenever a gateway is involved in the establishment of the end-to-end VoIP call, as is the case in all of the example scenarios described above.

The development of an end-to-end application layer VoIP QoS monitoring system for a large commercial service poses a number of challenges. First, a desirable system should introduce a minimal amount of measurement overhead traffic, scale with the size of the network, and be cost effective. One solution for monitoring the loss ratio and delay jitter is to use the Chariot system provided by Ganymede Software (URL: http://www.ganymede.com/html/products/chariot/index.phtml). In this system, so-called endpoints are placed in the IP network and emulated VoIP calls can be established between the endpoints. The loss and delay jitter is monitored on each emulated call and the results are processed and presented by a 'console' application.

The monitoring of one-way delays also poses a challenge. The main difficulties here are the problems of (i) time-synchronizing geographically separated PCs or servers to within a few milliseconds and (ii) maintaining a low drift between them in order to make accurate one-way delay measurements. One possible solution is to use the GPS time signals to synchronize time between the geographically separated PC's or servers. This can be done by deploying GPS Stratum-1 time servers at various sites. A Stratum 1 clock has a long-term accuracy of 10E-11. Stratum 1 clocks are generally used for synchronizing a few master sites in a digital telecommunications network. The synchronized signals propagate the time standard throughout the network. While providing a solution, this method is expensive and does not scale with network size. Another possible solution is to measure round-trip delays using 'ping' and then estimate the one-way delays from the round-trip delay measurements. However, for the measurement of grade of service and offered traffic at a gateway bridging the Internet and a public switched-telephone network, ping is of no use since it does not provide any information regarding the number of available PSTN channels at a gateway.

The monitoring of VoIP call GoS also presents a challenge. A theoretical solution to this problem is to have call generators, such as, for example, the Abacus from Zarak Systems (URL: http://www.zarak.com/product.htm), present calls to the various gateways and sample the number of blocked calls. This solution, however, is expensive and cumbersome, and does not provide satisfactorily accurate results due to sampling variance. Another possible approach is to poll the gateway for information on failed or refused calls. The problem with such an approach, however, is that inbound offered calls from the PSTN side may never even reach the gateway if they are blocked at the gateway-PSTN interfaces; thus they may never even be counted as failed or refused calls. Yet another possible approach is to derive the GoS from the gateway call-detail records that are already generated by the system for accounting and billing purposes. This approach, too, suffers from the drawback that offered calls that are blocked at the gateway-PSTN interface may never even reach the gateway. Moreover, the transmission, storage, and processing of large numbers of call records would be a cumbersome manner of trying to derive the GoS.

Thus, to truly enable the large scale deployment of commercial VoIP telephony, what is needed is an efficient, noncumbersome, technically straightforward, and scalable solution for monitoring the GoS and the offered traffic for VoIP at PSTN-IP gateways in an IP telecom network.

There is a need, therefore, for an apparatus and method that provides a technically straightforward, scalable solution for monitoring the GoS and offered traffic for VoIP at PSTN-IP gateways in an IP telecom network.

SUMMARY OF THE INVENTION

The present invention presents an apparatus and method for estimating the grade of service and offered traffic for voice over internet protocol calls at a gateway bridging calls between a public switched telephone network and an internet protocol network, the gateway having a dial-control management information base. The method comprises the steps of periodically polling the dial-control management information base for dial peer traffic statistics, storing the polled data, estimating the carried traffic using the polled data, estimating the grade of service by utilizing the Erlang-B formula in an inverse manner, operating on the estimated carried traffic obtained in the first estimating step, and estimating the offered traffic using the estimated values for the carried traffic and the grade of service obtained in the previous estimation steps. In a second embodiment of the invention a system utilizing the method is presented for continuously monitoring the grade of service and offered traffic at gateways in an internet protocol telecom network supporting voice over internet protocol. An enhancement of the system further comprises a world wide web interface for generating monitoring reports.

BRIEF DESCRIPTION OF THE DRAWINGS

The present invention will be more readily understood from a detailed description of the preferred embodiments taken in conjunction with the following figures.

DETAILED DESCRIPTION OF THE PREFERRED EMBODIMENTS

The approach of the present invention is based upon using the dial-peer statistics that are available through polling of the dial-control Management Information Base (MIB). The dial-control MIB is standardized in the Internet Engineering Task Force (IETF) Request for Comments No. 2128 (RFC 2128, available online at http://www.cis.ohio-state.edu/htbin/rfc/rfc2128.html) and is implemented in gateways commercially available such as, for example, the Cisco Systems AS5300 Universal Access Server. In the dial-control MIB, various statistics are recorded for each dial-peer in the gateway. Whenever a call is established through a gateway, a pair of dial-peers is used to establish a logical association at the session level between the IP and the PSTN sides of the call. Based upon the dial-peer statistics, the carried traffic is derived. Using the carried traffic results, the GoS is estimated therefrom by a unique approach: the application of the well known Erlang-B formula in an inverse manner. To achieve this result, it is necessary to solve the nonlinear Erlang-B formula in terms of the GoS. Having estimated the GoS, the offered traffic is then estimated. The method and apparatus of the present invention for estimating the GoS and the offered traffic at a gateway is suitable for implementation in a monitoring system for a large IP telecom network.

Figure 1A:
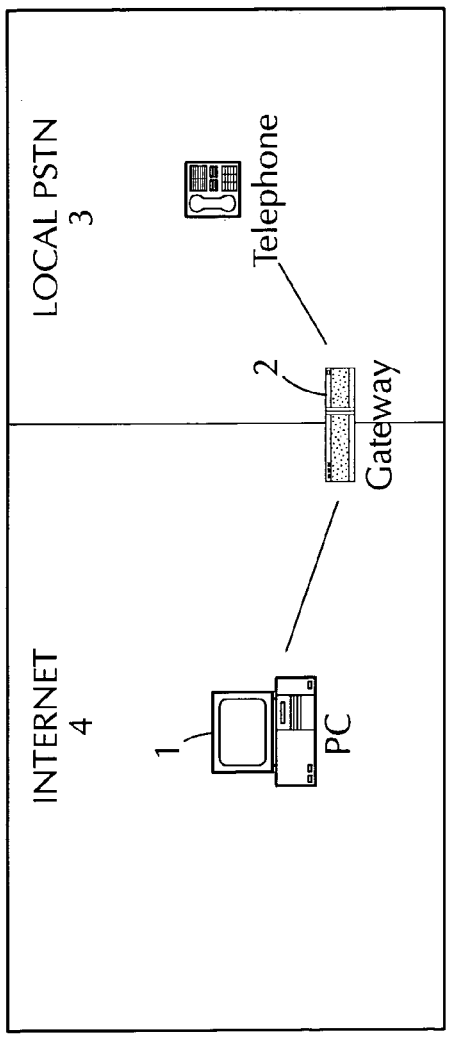
FIGS. 1A–1C are illustrations of various scenarios in which Voice Over Internet Protocol (VoIP) telephony is currently being offered.
Figure 1B:
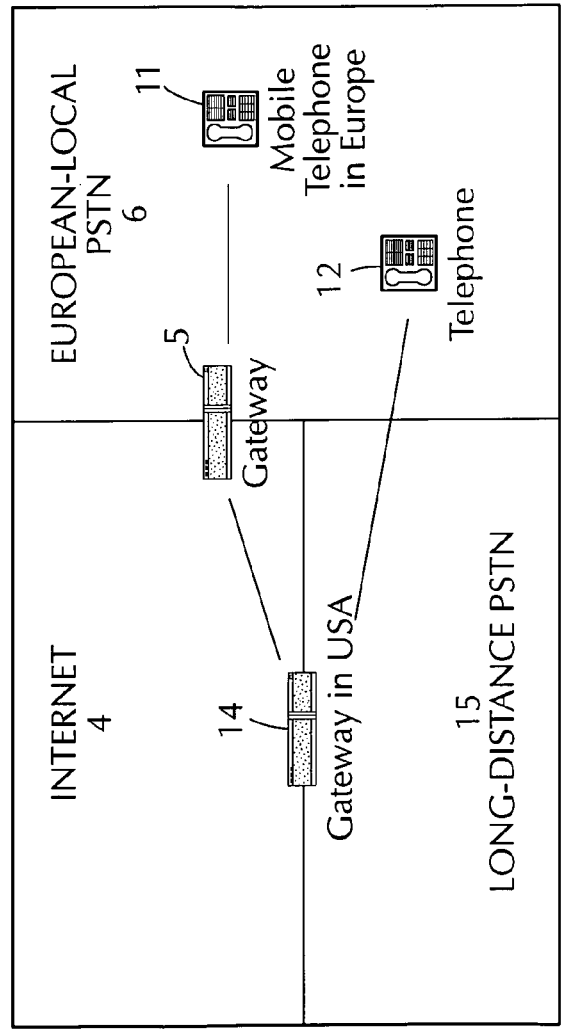
Figure 1C:
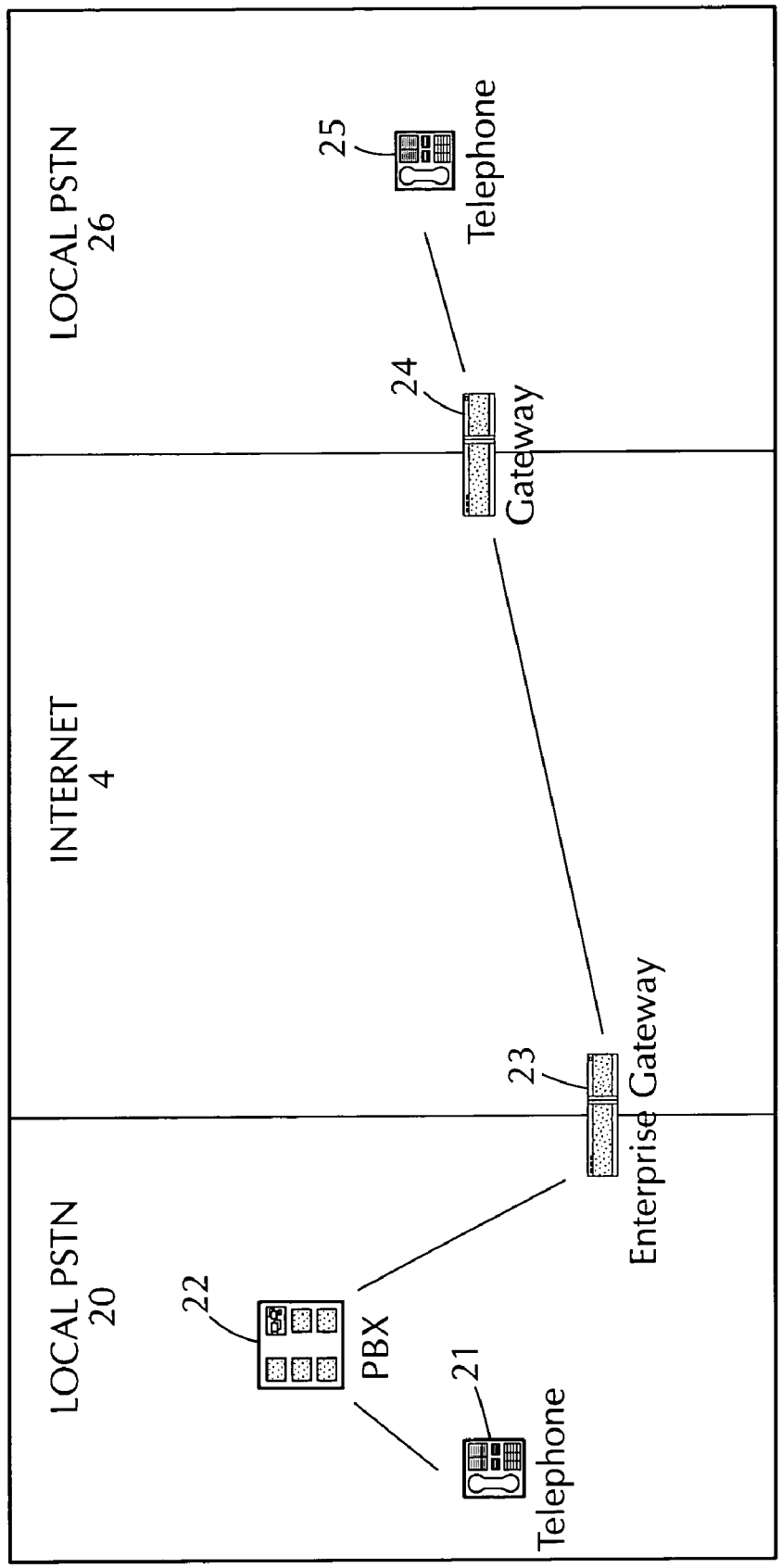
Figure 2:
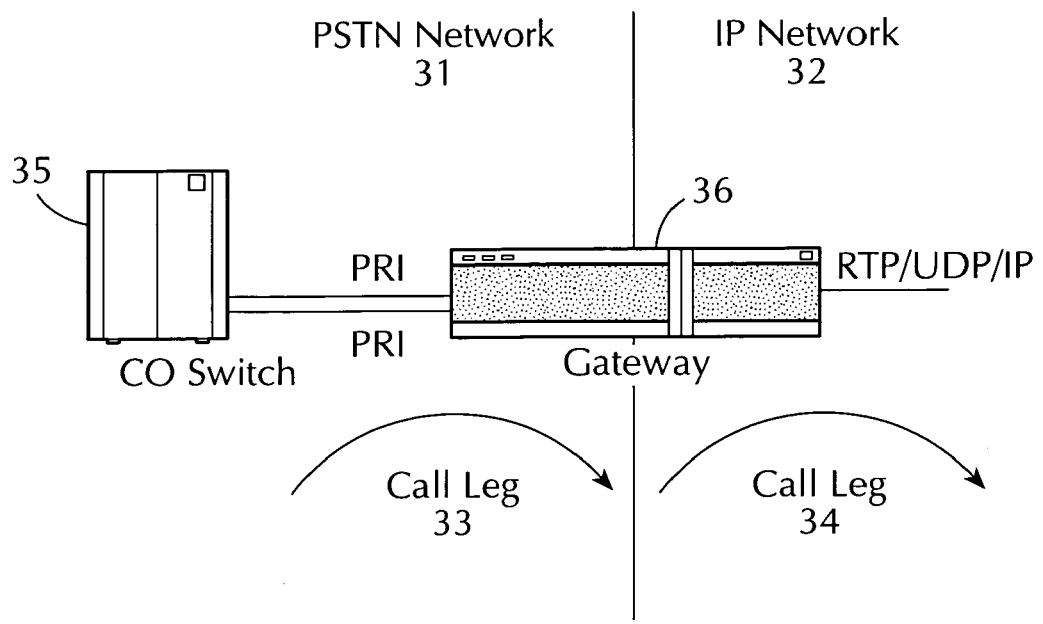
FIG. 2 is an illustration of a VoIP gateway at the interface between the Public Switched Telephone Network (PSTN) and the Internet.

The present invention will be described with respect to a VoIP gateway 2 at the interface between the PSTN 31 and the Internet 32, as illustrated in FIG. 2. The gateway 2 bridges the call between the Internet 32 and the PSTN network 31. On the PSTN side, calls are ultimately routed through the central office (CO) switch 35. The bridging of VoIP at a gateway is primarily a software function. On the IP side, the call is carried over Real Time Protocol/User Datagram Protocol (RTP/UDP) which is encapsulated in IP packets. The packet payload is typically 20 to 160 bytes with an RTP/UDP/IP header of 40 bytes. On the PSTN side, the call is carried over a circuit-switched connection such as an ISDN B channel. There are, typically, two or four ISDN Primary Rate Interfaces (PRIs) on the PSTN side of the gateway. Each PRI is typically configured to support 23 B channels. (An ISDN B channel is a 64 Kbs channel that can be used for circuit switched voice, circuit switched data, or high speed packet service).

In the establishment of a VoIP call across a gateway, there are two call legs. A call leg is a directed logical call segment defined between two points. At a gateway, there is one call leg on the PSTN side 33 and one call leg on the IP side 34. A so called dial-peer defines the characteristics of a particular call leg. A dial peer on the PSTN side 33 defines the characteristics of a traditional telephone connection. A PSTN dial peer associates a telephone number with a voice port. A dial peer on the IP side 34 defines the characteristics of a packet-switched connection. An IP dial peer points to a specific device on the IP network. When a VoIP call is established across a gateway 2, a specific pair of IP side 34 and PSTN side 33 dial peers is seized to complete the call legs that are required to form an end-to-end call. A gateway 2 will typically be configured with a multitude of dial peers.

The dial peers on the PSTN and IP sides are further classified as being inbound or outbound dial peers. Inbound dial peers are used for call legs that terminate on the gateway, while outbound dial peers are used for call legs that emanate from the gateway.

In one embodiment of the present invention, a method for estimating the call GoS at a gateway is based upon the use of dial peer traffic statistics that can be obtained by polling the dial control management information base (MIB). This standardized MIB maintains various traffic statistics for each configured dial peer. In particular, the statistics used are those found in the sequence DialCtlPeerStatsEntry, as defined in IETF RFC 2128 to be:

```
DialCtlPeerStatsEntry :: =
    SEQUENCE (
        dialCtlPeerStatsConnectTime         AbsoluteCounter32,
        dialCtlPeerStatsChargedUnits        AbsoluteCounter32,
        dialCtlPeerStatsSuccessCalls        AbsoluteCounter32,
        dialCtlPeerStatsFailCalls           AbsoluteCounter32,
        dialCtlPeerStatsAcceptCalls         AbsoluteCounter32,
        dialCtlPeerStatsRefuseCalls         AbsoluteCounter32,
        dialCtlPeerStatsLastDisconnectCause   OCTET STRING,
        dialCtlPeerStatsLastDisconnectText  DisplayString,
        dialCtlPeerStatsLastSetupTime       TimeStamp
    ).
```

In the above entry, the specific objects of interest for the method of determining the GoS and the offered traffic at a gateway are the accumulated connect time and the successfully completed calls counters, defined as follows:

```
dialCtlPeerStatsConnectTime OBJECT-TYPE
    SYNTAX    AbsoluteCounter32
    UNITS     "seconds*
    MAX-ACCESS read-only
    STATUS    current
    DESCRIPTION
        "Accumulated connect time to the peer since system startup.
        This is the total connect time, i.e. the connect time for
        outgoing calls plus the time for incoming calls."
    :: = {dialCtlPeerStatsEntry 1}
dialCtlPeerStatsSuccessCalls OBJECT-TYPE
    SYNTAX    AbsoluteCounter32
    MAX-ACCESS read-only
    STATUS    current
    DESCRIPTION
        "Number of completed calls to this peer."
    ::= {dialCtlPeerStatsEntry 3}
```

Note that AbsoluteCounter32 is defined in the standards to be an unsigned 32 bit counter that starts at zero, does not decrease, and does not wrap. It locks at the maximum value of 4,294,967,295.

In order to make use of the above counters to calculate traffic statistics, the counters are polled periodically using a Simple Network Management Protocol (SNMP) based network management system. Letting $CT(i,t)$ be defined as the value of dialCtlPeerStatsConnectTime for dial peer i at a time t and $SC(i,t)$ as the value of dialCtlPeerStatsSuccessCalls for dial peer i at time t, the following gateway performance parameters are then estimated using the polled values of $CT(i,t)$ and $SC(i,t)$:

| | |
|---|---|
| C | carried traffic (Erlangs) |
| G | gateway grade of service (GoS) |
| Δ | offered traffic load (Erlangs) |
| δ | offered traffic arrival rate (calls/second). |

First, the method for estimating the gateway grade of service will be described. The primary technical problem in estimating the gateway GoS is the fact that the offered traffic is an unknown that may not be determined from the dial peer counters or from other information that may be available at the gateway. The reason for this is that PSTN calls affixing to the gateway from the central office (CO) switch, as depicted in FIG. 2, will be blocked when all the ISDN B channels from the central office switch 35 to the gateway 36 are occupied. In such a scenario when all the ISDN B channels are occupied, new offered calls from the CO switch 35 will never even reach the gateway 36 and, consequently, cannot be counted there by either the failed call counter (dialCtlPeerStatsFailCalls) or the refused call counter (dialCtlPeerStatsRefuseCalls) in the DialCtlPeerStatsEntry data structure. As a practical solution to this problem, the present invention estimates the GoS by first estimating the carried traffic using the information provided by the CT function, and then utilizing the Erlang-B formula in an inverse manner to obtain the GoS, as described in detail in what follows, with reference to FIG. 5.

Figure 5:
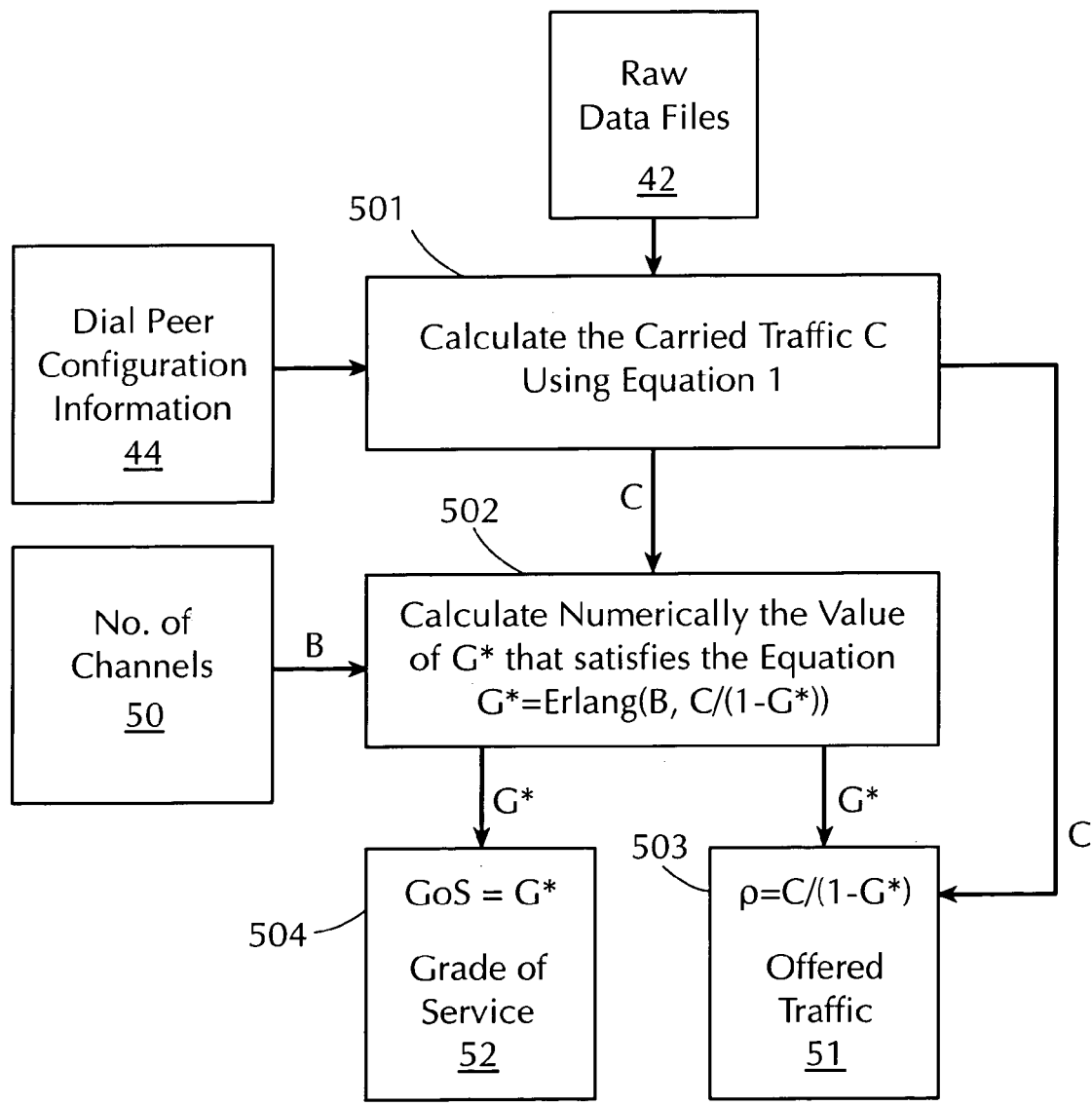
FIG. 5 is a flow chart illustrating the steps involved in calculating the carried traffic and from that result, the offered traffic and the grade of service, using as inputs the raw data files from a gateway monitoring system as well as the dial peer configuration information available from the management information base.

Consider a polling interval (a, b) specified in units of seconds, where the dial control MIB in a gateway is polled at the times a and b. Let I be the set of all dial peers on the gateway. Let $\delta(i)=1$ if dial-peer i is a dial peer on the PSTN-side, and 0 if the dial peer is on the IP-side. The indicator function $\delta(\ )$ is derived from the dial peer configuration information. An estimate of the carried traffic in the time interval (a, b) is then given by $$C = \sum_{i \in I} \delta(i)(CT(i, b) - CT(i, a))/(b - a). \quad (1)$$

designated as step 501 in FIG. 5. This estimate becomes more accurate as (b–a) is made larger, inasmuch as a smaller proportion of the calls will then straddle the polling times a and b. Assuming that the offered calls arrive according to a Poisson process, which is a reasonable assumption to make in trunk traffic engineering (and is an assumption underlying the Erlang-B formula), an estimate for the GoS in the time interval (a, b) is given by G=Erlang(B, Δ), where B is the total number of ISDN B channels on the public switched telephone network side of the gateway, Δ is the offered traffic load, as above, and Erlang(B, Δ) is the well-known Erlang-B formula, which gives the grade of service, or proportion of calls blocked and lost, if the number of channels available, B, and the offered traffic load (usually given for the busy hour, and also known as the Busy Hour Traffic, or BHT) are known. Since the actual offered traffic load is unknown, one may also state the offered traffic in terms of a calculable quantity, C:

$$\Delta(1-G)=C. \quad (2)$$

This simply states the fact that the carried traffic is nothing more than the fraction of the offered traffic that gets through, or, the offered traffic less the proportion (expressed as a fraction between zero and unity) of the traffic that is lost; i.e., less the grade of service. Therefore the carried traffic is equal to the offered traffic less the grade of service, or $\Delta(1-G)=C$, and dividing both sides of this equation by the quantity (1–G), which is the fraction of offered calls that do get through, one has $\Delta=C/(1-G)$. Thus, a convenient substitution for A is obtained. Plugging this expression for A into the Erlang equation, one has $$G=\text{Erlang}(B, C/(1-G)), \quad (3)$$

where G is the grade of service, thus giving the Erlang-B formula in terms of G and eliminating Δ. The grade of service being simply the output of the Erlang operator on the number of channels B and the offered traffic load $C/(1-G)$, which is the equivalent of $\Delta$. In equation 3, B is known and C is given by equation 1. If $G=G^*$ is a solution to this non-linear equation such that $0<G<1$, then an estimate for the GoS that is seen by the offered traffic in the time interval (a, b) is given by $G^*=\text{Erlang}(B, C/(1-G^*))$. Step 502 utilizes this equation to obtain the grade of service 52, which is output in step 504. $G^*$ is the only solution of interest, because in the real world only values of G between zero and one have meaning, as the grade of service must be a fraction between zero and one, inasmuch as no less than none of, and no more than all of, the offered traffic load can be lost.

Figure 3:
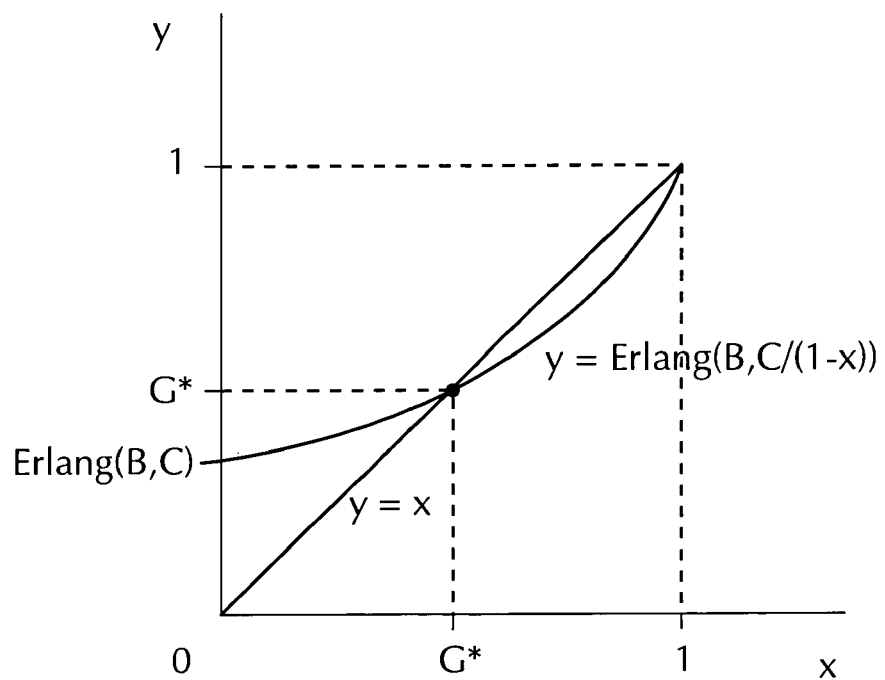
FIG. 3 shows graphically the solution of the equation $G=\text{Erlang}(B, C/(1-G))$ for $G=G^*$, where $G^*$ denotes a solution of the equation subject to the condition that $0<G^*<1$.
Figure 6:
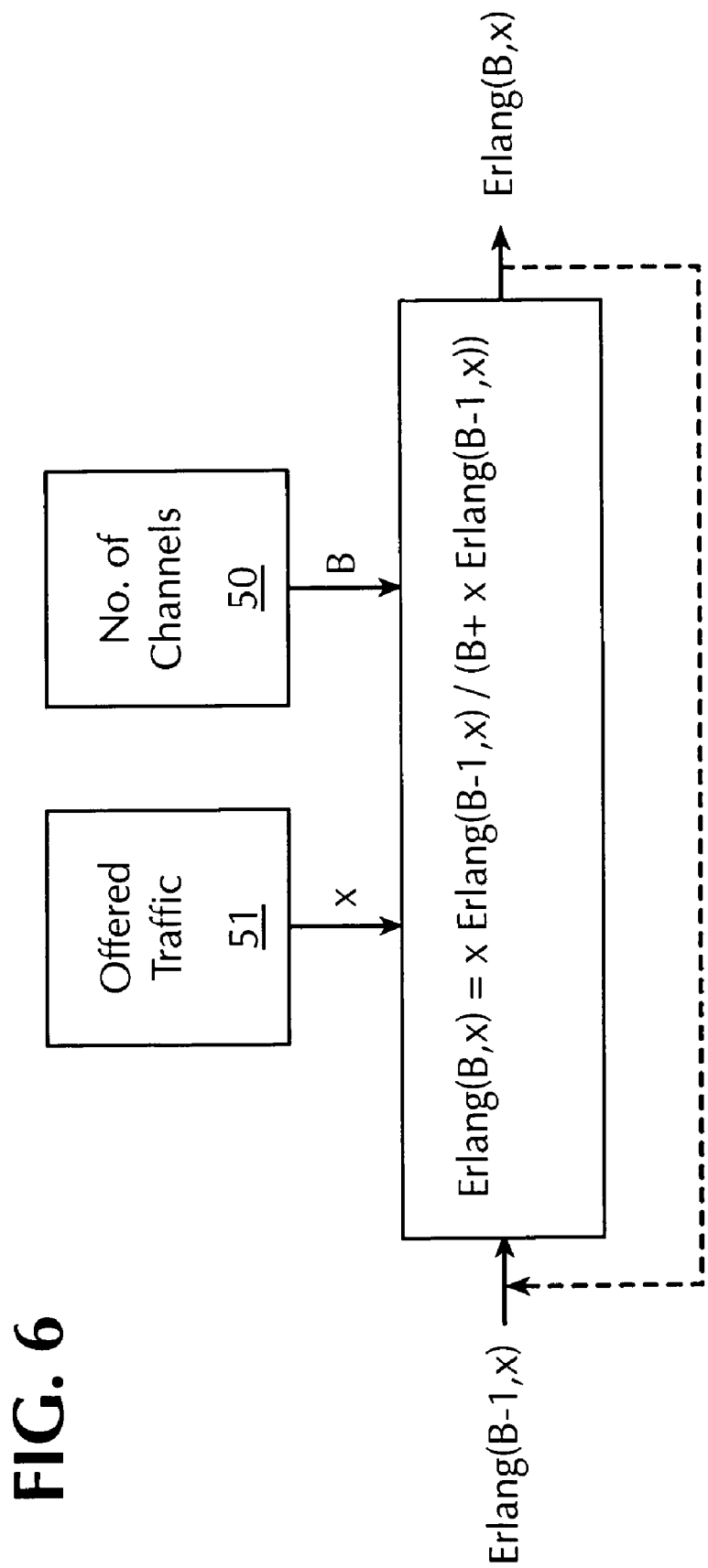
FIG. 6 illustrates the recursive calculation of the Erlang B formula using as inputs the offered traffic x, and the number of channels entering the gateway B.

Since G appears on both sides of this equation, analytical methods to solve it are unavailable. The solution to equation 3 for $G^*$ may be found numerically by simply increasing G from 0 towards 1 in small increments until $\text{Erlang}(B, C/(1-G))<G$ is satisfied. This method is depicted graphically in FIG. 3, where the curve is a plot of the function $y=\text{Erlang}(B, C/(1-x))$, for a given fixed B and C, and the line is a plot of the function $y=x$. The two plots intersect at two points, corresponding to where $y=x=1$, the obvious case where the grade of service is unity, and all calls are lost, and a point where $y=x$ is between zero and one. This point provides the solution desired, where the variable G is equal to the value $G^*$, and where the output of the Erlang equation is also equal to $G^*$. As depicted in FIG. 6, the Erlang-B formula may be computed using the well-known recursion formula $\text{Erlang}(B, \Delta)=\Delta\text{Erlang}(B-1, \Delta)/(B+\Delta\text{Erlang}(B-1, \Delta))$, with the initial condition set such that $\text{Erlang}(0,\Delta)=1$, where B is the number of channels (running from the central office switch 35 to the gateway on the PSTN side) 50, and $\Delta$, labeled as x 51 in FIG. 6, is the offered traffic, as calculated in step 503 of FIG. 5. The initial condition of $\text{Erlang}(0,\Delta)=1$ is simply the fact that with zero available channels, no matter what the offered traffic load $\Delta$, all calls are necessarily lost; thus the Erlang formula, which calculates the grade of service, or proportion of calls which are lost, is 1, or all of them. Thus, as shown in FIG. 6, inputting the values for the offered traffic, x 51, and B 50, the number of channels entering the gateway, the following pseudo-code offers a possible implementation for numerically calculating $G^*$ as per the above described method:

delta=0.001;
G=0.0;
While (Erlang(B, C/(1-G))>G and G<1.0) G=G+delta;
G=G-delta;
Gasterisk=Erlang(B, C/(1-G)).

By decreasing delta, the accuracy of the solution $G^*$ can be improved.

Having thus obtained $G^*$, equation 2, shown as step 502 in FIG. 5, is used to provide the following estimate for the offered traffic 51 in the time interval (a,b): $\Delta=C/(1-G^*)$, output in step 503.

From the calculated offered traffic it is a simple matter to estimate the offered call arrival rate 8 at the gateway in the time interval (a, b). First, the mean call holding time h (sometimes referred to as $1/\mu$) in the time interval (a,b) which is given by $$h = \sum_{i \in I} \delta(i)(CT(i, b) - CT(i, a)) \bigg/ \sum_{i \in I} \delta(i)(SC(i, b) - SC(i, a)). \quad (4)$$

is estimated. This estimate for h improves as (b−a) is made larger, inasmuch as more calls will fall within the interval, and the chances of calls straddling the interval diminish. An estimate of the offered call arrival rate in the time interval (a, b) is then given by $8=C/(h(1-G^*))$, where C is given by equation 1. As can be seen by inspection, 8 is simply $\Delta/h$. Thus the parameters A, G and 8 have been estimated.

A second embodiment of the present invention consists of utilizing the method of the first embodiment, and implementing it in a system for continuously monitoring VoIP GoS and offered traffic at the gateways in an IP Telecom network. Such a monitoring system is depicted in FIG. 4.

Figure 4:
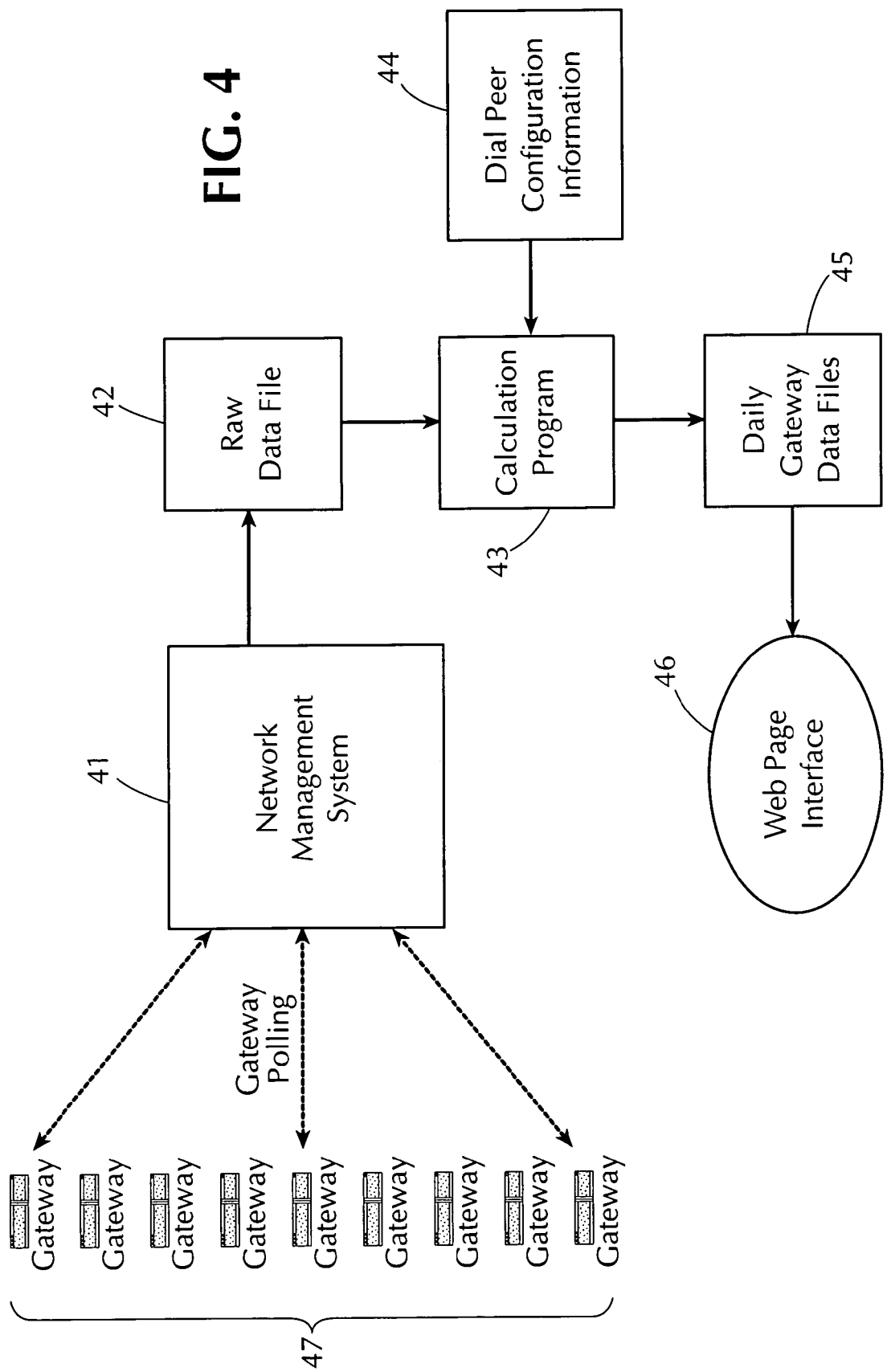
FIG. 4 depicts an exemplary monitoring system of the second embodiment of the invention for continuously monitoring the voice over internet protocol grade of service and offered traffic at a bridging gateway between a public switched telephone network and the Internet.

FIG. 4 depicts a series of gateways 47, each having numerous dial peers. The gateways are polled by a network management system 41, itself running on a computer (not shown). On each gateway poll the network management system time stamps the retrieved polled dial peer traffic statistics. The network management system 41 writes the raw data to a file 42, which is processed at user selected time intervals by a calculation program 43. The calculation program makes use of the dial peer configuration information 44, and provides the estimated grade of service and offered traffic at each gateway at user set times at various intervals throughout the day. This information is stored in the daily gateway data files 45, and is available to the user for monitoring the traffic and performance at the series of gateways in the user's network. In an enhancement to this embodiment, a web page interface 46 is used to disseminate the gateway parameter estimations, and through the web interface 46, a monitoring report for any gateway measure and any specified time period can be conveniently generated.

As an example of the second embodiment of the invention, with reference to FIG. 4, the dial control management information base in each gateway 47 is polled every 3 hours using a network management system 41 such as, for example, the Netview network management system sold by Tivoli Systems, Inc. (URL: http://www.tivoli.com), as described online at http://www.tivoli.com/products/index/netview/, running on a computer such as, for example, a Sun Ultra 450. Workstation (See http://www.sun.com/desktop/products/Ultra450/). In such an exemplary system of the second embodiment of the invention, at each gateway 47 there can be on the order of 400 dial peers. Due to the number of gateways 47 in the network of such a system, and the number of dial peers on each gateway, it would be undesirable to poll each gateway too frequently due to the volume of management information base (MIB) data that is retrieved in each poll and the processing requirements that are then placed on the network management system 41. On the other hand, a small polling interval is desirable to increase the granularity of the measurements. Thus a compromise needs to be made in choosing the polling period T for the system of the second embodiment of the invention. As an example, T=3 hours is seen to be one of numerous possible reasonable intervals.

In this example of the second embodiment of the invention, at each gateway Simple Network Management Protocol (SNMP) poll, the network management system 41 timestamps the retrieved MIB counter data and writes the raw data to a file 42. Once a day, at night for example, the data in the network management system polled data file 42 is processed by a custom-developed program 43, written, for example, in Perl scripts, to provide the estimated GoS and offered traffic for each gateway as a function of the time of day. The calculation program 43 makes use of the dial peer configuration information 44. The indicator function *( ), defined above, is based on such dial peer configuration information 44. In the example of the second embodiment of the invention discussed above, where the polling interval T=3, the processing thus provides 24/T=8 data points each day for the estimated GoS and offered traffic at each gateway. The daily data is stored on the computer, as in the above example, a Sun Ultra 450. Workstation, in a separate file 45 for each gateway. After this daily processing is complete, the network management program raw data file from the previous day could be deleted. To facilitate the generation and dissemination of reports on gateway measures as a function of time, as an enhancement of the second embodiment of the invention, a web page interface 46 has been developed.

While the present invention has been described with respect to what is presently considered to be the preferred embodiments, it is to be understood that the invention is not limited to those embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for estimating the grade of service (GoS) and offered traffic for voice over internet protocol (VoIP) calls at a gateway bridging calls between a public switched telephone network and an internet protocol network, the gateway having a dial-control management information base, the method comprising the steps of:
periodically polling a dial-control management information base for dial peer traffic statistics;
storing the polled data;
estimating the carried traffic using the polled data;
estimating the grade of service by utilizing the Erlang-B formula in an inverse manner, operating on the estimated carried traffic obtained in the first estimating step; and
estimating the offered traffic using the estimated values for the carried traffic and the grade of service obtained in the previous estimation steps,
where the dial-control management information base is standardized as per RFC 2128, and where the dial peer traffic statistics obtained in the polling step comprise at least dialCtlPeerConnectTime and dialCtlPeerStatsSuccessCalls as defined in said standard, and
where the carried traffic is estimated using the following equation:

$$C = \sum_{i \in I} \delta(i)(CT(i,b) - CT(i,a))/(b-a),$$

where, for each dial peer i, $CT(i,b)$ is the value of dialCtlPeerConnectTime for dial peer i at time b, $CT(i,a)$ is the value of dialCtLPeerConnectTime for dial peer i at time a, and $\delta(i)=1$ if dial-peer i is a dial-peer on the public switched telephone network side of the gateway, $\delta(i)=0$ if the dial-peer is on the internet protocol side of the gateway, and C is the summation over all dial peers, giving the total carried traffic for the gateway.

2. The method of claim 1, where:
the grade of service seen by the offered traffic in the time interval (a,b) is given by grade of service=Erlang(B, C/(1−G*)), where B is the total number of ISDN B channels on the public switched telephone network side of the gateway, Erlang( ) is the Erlang-B formula, and G* is a solution of the equation G*=Erlang(B, C/(1−G)) subject to the condition that 0<G*<1, and the offered traffic is estimated as $\Delta = C/(1-G^*)$ in the time interval (a,b).

3. The method of claim 1 where G* is found using numerical methods, and the Erlang-B formula is computed using the following well-known recursion formula:

Erlang(B, Δ)=ΔErlang(B−1,Δ)/(B+ΔErlang(B−1,Δ)), with the initial condition set such that Erlang(0,Δ)=1.

4. An apparatus for estimating the grade of service and offered traffic for voice over internet protocol calls at a gateway bridging calls between a public switched telephone network and an internet protocol network, where the gateway has a dial-control management information base, the apparatus comprising:
means for periodically polling the dial control of the management information base for dial peer traffic statistics;
means for storing the polled data;
a first estimating means for estimating the carried traffic using the polled data;
a second estimating means for estimating the grade of service by utilizing the Erlang-B formula in an inverse manner operating on the carried traffic result from the first estimating means;
a third estimating means for estimating the offered traffic using the estimated values for the carried traffic and the grade of service obtained by the first and second estimation means; and
means for numerical calculation for processing numerical data needed by each of the first, second and third estimation means,
where the dial-control management information base is standardized as per the standard described in the Internet Engineering Task Force (IETF) Request for Comment (RFC) 2128,
where the dial peer traffic statistics obtained by the means for polling comprise at least the dialCtlPeerConnectTime and dialCtlPeerStatsSuccessCalls as defined in said standard, and
where the carried traffic is estimated by the first estimating means using the following equation:

$$C = \sum_{i \in I} \delta(i)(CT(i,b) - CT(i,a))/(b-a),$$

where $CT(i,b)$ is the value of dialCtlPeerConnectTime for dial peer i at time b, $CT(i,a)$ is the value of dialCtlPeerConnectTime for dial peer i at time a, and $\delta(i)=1$ if dial-peer i is a dial-peer on the PSTN side of the gateway, and $\delta(i)=0$ if the dial-peer is on the IP side of the gateway, and I is the set of all dial peers at the gateway;
the estimate made by the second estimating means of the GoS seen by the offered traffic in the time interval (a,b) is given by solving the equation GoS=Erlang(B, C/(1−G*)), wherein B is the total number of ISDN B channels on the public switched telephone network side of the gateway, Erlang( ) is the Erlang-B formula, and G* is a solution of the equation G*=Erlang(B, C/(1−G*)) subject to the condition that 0<G*<1, wherein said solution G* is generated by the means for numerical calculation; and
the offered traffic is estimated by the third estimating means to be $\Delta = C/(1-G^*)$ in the time interval (a,b).

5. The apparatus of claim 4 where the nonlinear equation solution G* is found by the means for numerical calculation using numerical methods, and the Erlang-B formula is computed by the means for numerical calculation using the following well known recursion formula:

$$\text{Erlang}(B,\Delta)=\Delta\text{Erlang}(B-1,\Delta)/(B+\Delta\text{Erlang}(B-1,\Delta)),$$

with the initial condition set such that $\text{Erlang}(0,\Delta)=1$.

6. Computer executable code stored on one or more computer readable media, the code for estimating the grade of service and offered traffic for voice over internet protocol calls at a gateway bridging calls between a public switched telephone network and an internet protocol network, where said gateway has a dial-control management information base, the code comprising code to cause the performance of the steps of:

periodically polling the dial control of the management information base for dial peer traffic statistics;

storing the polled data;

estimating the carried traffic using the polled data;

estimating the grade of service by utilizing the Erlang-B formula in an inverse manner operating on the estimated carried traffic obtained in the first estimating step, and the number of channels on the public switched telephone network side of the gateway; and estimating the offered traffic using the estimated values for the carried traffic and the grade of service obtained in the previous estimation steps, where the carried traffic is estimated using the following equation:

$$C = \sum_{i \in I} \delta(i)(CT(i, b) - CT(i, a))/(b - a),$$

where, for each dial peer i, CT(i,b) is the value of dialCtlPeerConnectTime for dial peer i at time b, CT(i,a) is the value of dialCtlPeerConnectTime for dial peer i at time a, and $\delta(i)=1$ if dial-peer i is a dial-peer on the public switched telephone network side of the gateway, $\delta(i)=0$ if the dial-peer is on the internet protocol side of the gateway, and C is the summation over all dial peers, giving the total carried traffic for the gateway.

7. Computer executable code stored on one or more computer readable media, the code for estimating the grade of service and offered traffic for voice over internet protocol calls at a gateway bridging calls between a public switched telephone network and an internet protocol network, where said gateway has a dial-control management information base, the code comprising code to cause the performance of the steps of:

periodically polling the dial control of the management information base for dial peer traffic statistics;

storing the polled data;

estimating the carried traffic using the polled data;

estimating the grade of service by utilizing the Erlang-B formula in an inverse manner operating on the estimated carried traffic obtained in the first estimating step, and the number of channels on the public switched telephone network side of the gateway; and estimating the offered traffic using the estimated values for the carried traffic and the grade of service obtained in the previous estimation steps, where the grade of service seen by the offered traffic in the time interval (a,b) is given by grade of service=Erlang (B, C/(1−G*)), where B is the total number of ISDN B channels on the public switched telephone network side of the gateway, Erlang( ) is the Erlang-B formula, and G* is a solution of the equation G*=Erlang(B, C/(1−G*)) subject to the condition that 0<G*<1, and the offered traffic is estimated as $\Delta=C/(1-G^*)$ in the time interval (a,b).

8. Computer executable code stored on one or more computer readable media, the code for estimating the grade of service and offered traffic for voice over internet protocol calls at a gateway bridging calls between a public switched telephone network and an internet protocol network, where said gateway has a dial-control management information base, the code comprising code to cause the performance of the steps of:

periodically polling the dial control of the management information base for dial peer traffic statistics;

storing the polled data;

estimating the carried traffic using the polled data;

estimating the grade of service by utilizing the Erlang-B formula in an inverse manner operating on the estimated carried traffic obtained in the first estimating step, and the number of channels on the public switched telephone network side of the gateway; and estimating the offered traffic using the estimated values for the carried traffic and the grade of service obtained in the previous estimation steps, where G* is found using numerical methods, and the Erlang-B formula is computed using the following recursion formula:

$$\text{Erlang}(B,\Delta)=\Delta\text{Erlang}(B-1,\Delta)/(B+\Delta\text{Erlang}(B-1\Delta)),$$

with the initial condition set such that $\text{Erlang}(0,\Delta)=1$.

* * * * *